(12) United States Patent
Liu et al.

(10) Patent No.: US 11,484,982 B2
(45) Date of Patent: Nov. 1, 2022

(54) ONLINE CNC MACHINE TOOL GEOMETRIC/THERMAL ERROR MEASUREMENT AND COMPENSATION SYSTEM

(71) Applicant: DALIAN UNIVERSITY OF TECHNOLOGY, Dalian (CN)

(72) Inventors: Kuo Liu, Dalian (CN); Te Li, Dalian (CN); Yongquan Gan, Dalian (CN); Wei Han, Dalian (CN); Dawei Li, Dalian (CN); Zhisong Liu, Dalian (CN); Yongqing Wang, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 527 days.

(21) Appl. No.: 16/636,268

(22) PCT Filed: Feb. 21, 2019

(86) PCT No.: PCT/CN2019/075711
§ 371 (c)(1),
(2) Date: Feb. 3, 2020

(87) PCT Pub. No.: WO2020/155227
PCT Pub. Date: Aug. 6, 2020

(65) Prior Publication Data
US 2021/0023667 A1    Jan. 28, 2021

(30) Foreign Application Priority Data
Jan. 31, 2019    (CN) .......................... 201910100940.0

(51) Int. Cl.
G01K 15/00    (2006.01)
B23Q 11/00    (2006.01)
G05B 19/404    (2006.01)

(52) U.S. Cl.
CPC ........ B23Q 11/0007 (2013.01); G05B 19/404 (2013.01); *G01K 15/00* (2013.01); *G05B 2219/49207* (2013.01)

(58) Field of Classification Search
CPC .............. B23Q 11/0007; G05B 19/404; G05B 22/49207
See application file for complete search history.

(56) References Cited

U.S. PATENT DOCUMENTS

2021/0026319 A1*  1/2021  Liu ...................... G05B 19/404
2021/0048793 A1*  2/2021  Liu ..................... G05B 19/4155

FOREIGN PATENT DOCUMENTS

CN    102629121 A    8/2012
CN    106239368 A    12/2016
(Continued)

*Primary Examiner* — Gail Kaplan Verbitsky
(74) *Attorney, Agent, or Firm* — Muncy, Geissler, Olds & Lowe, P.C.

(57) ABSTRACT

An online geometric/thermal error measurement and compensation system for computer numerically controlled (CNC) machine tools belonging to the technical field of error testing and compensation of CNC machine tools. The online CNC machine tool geometric/thermal error measurement and compensation system includes two parts: the hardware platform and the measurement and compensation software. The hardware platform includes a unidirectional acceleration sensor, a precision integrated circuit (IC) temperature sensor, a multi-channel temperature data collector, and a geometric/thermal error measurement and compensation host. The error measurement and compensation software runs in the geometric/thermal error measurement and compensation host and realizes testing and compensation of geometric and thermal errors in machine tools, which are communicated to the FANUC CNC system.

1 Claim, 8 Drawing Sheets

(56) References Cited

FOREIGN PATENT DOCUMENTS

| | | | | |
|---|---|---|---|---|
| CN | 107065771 | A | | 8/2017 |
| CN | 108345274 | A | | 7/2018 |
| CN | 109531240 | A * | | 3/2019 |
| CN | 112147951 | A * | | 12/2020 |
| WO | WO-2003073185 | A1 | | 9/2003 |
| WO | WO-2016065492 | A1 * | 5/2016 | ......... G05B 19/4069 |

* cited by examiner

ONLINE CNC MACHINE TOOL GEOMETRIC/THERMAL ERROR MEASUREMENT AND COMPENSATION SYSTEM

TECHNICAL FIELD

The invention belongs to the technical field of error testing and compensation of computer numerically controlled (CNC) machine tools and is specifically a linear measurement and compensation system for measuring and compensating for geometrical/thermal errors in CNC machine tools.

BACKGROUND

Errors of CNC machine tools mainly include geometric error, thermal error, control error, and force error. Among these, geometric and thermal errors will have the largest impact on the machine tool. Geometric errors not only affect positional accuracy, but also affect accuracy of the curve. Thermal errors influence positional accuracy as well as stability of the CNC machine tool. In order to reduce the influence of geometric and thermal errors on machining accuracy of CNC machine tools, measures should be taken to improve assembly precision. For this, full closed-loop control is generally adopted along with controlled cooling rates. Although these measures have some effect, they also increase the cost of machine tools. The error compensation technique can effectively reduce geometric errors and thermal errors at a lower cost.

In the patent "measuring device CNC machine translation axis and the geometric errors of measurement and recognition method" (application number: CN201310335401.8), a laser tracker is used to identify machine geometric errors at four different positions; another patent entitled "machine translation axis laser interferometer based on geometric errors fast measurement method" (application number: CN201710231122.5), describes the use of laser interferometers at two different positions to derive linear and angular translational axis error. In the patent "numerical control machine that thermal error compensating apparatus and method" (application number: CN201510800430.6), real-time thermal error is predicted based on temperature data and thermal error model, the thermal error compensation is realized based on piezoelectric ceramic micro—displacement actuator.

Based on an analysis of current research, existing problems with geometric and thermal error measurement and compensation systems include the following:

(1) Current geometric error tests require a laser interferometer, a laser tracker, and other specialized precision instruments, which lead to several disadvantages such as complicated operation and high cost;

(2) Since existing measuring instruments can only perform offline measurements, online machine measurement and compensation cannot be realized, however, geometric accuracy will change throughout the machining process.

SUMMARY OF INVENTION

The present invention addresses the problems of existing geometric and thermal error measurement and compensation systems. The invention provides an online geometric/thermal error measurement and compensation system for CNC machine tools that can achieve real-time geometric and thermal error measurement and compensation.

The technical solution of the invention is as follows:

The online CNC machine tool geometric/thermal error measurement and compensation system is mainly composed of two parts, a hardware of measurement and compensation system and a software of measurement and compensation system. The hardware of the measurement and compensation system includes a unidirectional acceleration sensor, a digital precision integrated circuit (IC) temperature sensor, and a multi-pass channel temperature data logger and a geometric/thermal error measurement and compensation host. Geometric/thermal error data processing and compensation, communication with numerical control system and reading and writing data are controlled via the software of measurement and compensation of the system operated in the geometric/thermal error measurement and compensation host.

The unidirectional acceleration sensor is connected to the geometric/thermal error measurement and compensation host via a coaxial shielded cable and the acceleration signal is sent to the geometric/thermal error measurement and compensation host in analog form. The digital precision IC temperature sensor connects to a multi-pass channel temperature data logger through a four-core shielded cable and sends temperature data to a multi-pass channel temperature data logger based on a single-line bidirectional communication protocol. The multi-pass channel temperature data logger can connect to up to ten temperature sensors. The multi-pass channel temperature data logger connects to the geometric/thermal error measurement and compensation host through the three-core shielded cable and sends the aggregated temperature data to the geometric/thermal error measurement and compensation host based on the Modbus RTU communication protocol. the geometric/thermal error measurement and compensation host connects to the FANUC CNC through a twisted pair cross cable and the communication is carried out based on the FOCAS II network communication protocol.

Software of Measurement and Compensation System:

(1) Based on the acceleration signal, the straightness error of the feed axis of the machine tool is obtained by applying the geometric error identification algorithm of the feed axis. The geometric error identification algorithm of the feed axis is $$\begin{cases} s(t) = \int\int a(t)dt - \frac{1}{2}a_0 t^2 - v_0^{\perp} t - x_0^{\perp} \\ x(t) = v^{\parallel} \end{cases} \qquad (1)$$

where s(t) is the real-time displacement, $x_0^{\perp}$ is the initial displacement in the vertical direction, $v_0^{\perp}$ is the initial velocity perpendicular to the axial direction, $a_0$ is the DC component of the acceleration signal, a(t) is the real-time acceleration, $v^{\parallel}$ is the constant velocity along the axial direction, and x(t) the axial real-time length. Solving Equation (1), the relationship between the real-time displacement s(t) and the axial test stroke x is obtained as $$s(x) = \int\int a(x/v^{\parallel})dt - \frac{1}{2}a_0\left(\frac{x}{v^{\parallel}}\right)^2 - v_0^{\perp} t - x_0 \qquad (2)$$

Then, the two-point line connection method is applied to calculate the straightness error of the feed axis according to s(x). The specific calculation is $$E_s(x) = s(x) - \frac{s(\text{end}) - s(0)}{L} x \quad (3)$$

where $E_S(x)$ is the straightness error, L is the total test stroke, x is the test stroke, s(end) is the final displacement at the end of the test, and s(0) is the displacement at the starting point of the test;

(2) Based on the position and the temperature signal applied to the feed shaft thermal error model, thermal errors are predicted in real time. Dividing the feed shaft thermal error model screw into N segments, each of length l, the thermal error is calculated as $$E_f(m, t) = \sum_{i=1}^{m} k \times l \times (T_i(t) - T_0) \quad (4)$$

$$T_i(t) = T_i(t - \Delta t) + \gamma \times Q -$$
$$\left\{ \alpha \times \frac{[T_i(t - \Delta t) - T_{i-1}(t - \Delta t)] + [T_i(t - \Delta t) - T_{i+1}(t - \Delta t)]}{l} + \right.$$
$$\left. \beta \times [T_i(t - \Delta t) - T_f(t - \Delta t)] \right\} \times \Delta t$$

where $E_f(m,t)$ is the calculated value of thermal error to the m-th section of the screw at the current time, $T_i(t)$ is the temperature corresponding to the i-th section of the screw at the current time, Q is the heat generated through the nut of the screw in each segment, $T_i(t-\Delta t)$ is the temperature to the i-th section of the screw at the previous time, $T_f(t-\Delta t)$ is the temperature of the air in contact with the surface of the screw at the previous moment, $\Delta t$ is the sampling period, and k, $\alpha$, $\beta$, and $\gamma$ are coefficients;

(3) To realize communication with FANUC numerical control system based on the FOCAS II protocol, reading of the machine tool coordinates and writing of the error compensation value, and compensation based on extended external mechanical coordinate origin offset function, the following steps are performed:

1) Set "embedded/PCMCIA" as a valid ethernet device in the FANUC control system;

2) Set relevant parameters of the "expanded external machine coordinate origin shift function" and turn on the function;

3) The software of measurement and compensation system establishes a connection with the IP address and port number of the FANUC numerical control system. Once the connection is successful, the mechanical coordinates of the feed axis are read, data from the unidirectional acceleration sensor and the temperature sensor are simultaneously acquired, and the geometry/heat is calculated. The integrated error compensation value is used to write the error compensation value to the numerical control system. The current integrated geometric/thermal error compensation value is calculated as follows:

$$C(x, t) = -[E_s(x) + E_f(m, t)] \quad (5)$$

Advantages of the present invention are that the acceleration sensor can quickly and efficiently obtain the straightness error and no expensive or specialized equipment are required. When the geometric accuracy of the machine tool changes, compensation is achieved in a timely manner. The present invention improves the precision, stability, and machining accuracy of the machine tool through the geometric error measurement and compensation, thereby improving the yield and efficiency of machining, without incurring excessive costs.

DETAILED DESCRIPTION

To clearly describe the objectives, technical solutions, and advantages of the present invention, accompanying drawings are provided for a certain configuration FANUC 0$i$ MD CNC system vertical machining center as an embodiment and the embodiment of the present invention will be described.

Figure 1:
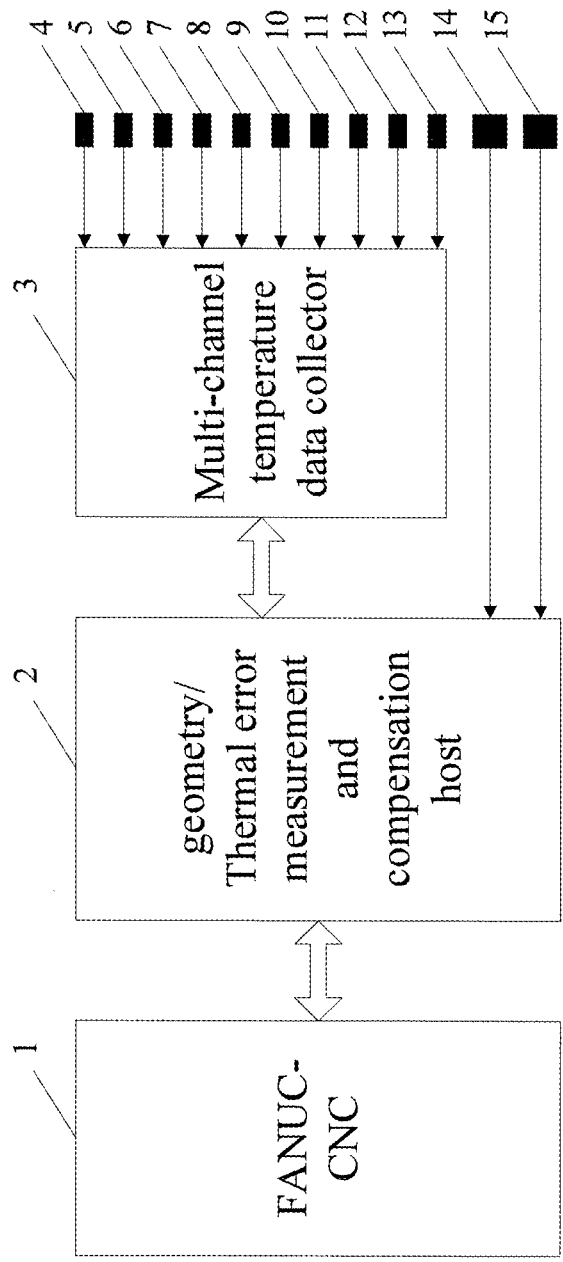
FIG. 1 is a hardware connection diagram of the geometric/thermal error online measurement and compensation system and shows the following components: 1 FANUC numerical control system; 2 geometric/thermal error measurement and compensation host; 3 multi-pass channel temperature data logger; 4 first temperature sensor; 5 second temperature sensor; 6 third temperature sensors; 7 fourth temperature sensors; 8 fifth temperature sensors; 9 sixth temperature sensors; 10 seventh temperature sensors; 11 eighth temperature sensors; 12 ninth temperature sensors; 13 tenth temperature sensors; 14 first unidirectional acceleration sensor; 15 second unidirectional acceleration sensor.

Basic machine information: Maximum travel of the X-axis, Y-axis, and Z-axis is 710 mm, 500 mm and 350 mm, respectively, and the respective maximum feed speeds are 32 m/min, 32 m/min, and 30 m/min; the maximum spindle speed is 15000 r/min The hardware of the present invention is as shown in FIG. 1, comprising unidirectional acceleration sensors 14 and 15, digital precision IC temperature sensors 4-13, multi-pass channel temperature data logger 3, and geometric/thermal error measurement and compensation host 2. The hardware connection and communication methods are as follows:

(1) The unidirectional acceleration sensors 14 and 15 are connected to geometric/thermal error measurement and compensation host 2 via coaxial shielded cables and the acceleration signal is sent to the geometric/thermal error measurement and compensation host 2 in analog form;

(2) Digital precision IC temperature sensors 4-13 are connected to multi-pass channel temperature data logger 3 through four-core shielded cables and the method used for transferring temperature data to the multi-pass channel temperature data logger 3 is based on the single-line bidirectional communication protocol.

(3) Multi-pass channel temperature data logger 3 is connected to geometric/thermal error measurement and compensation host 2 through three-core shielded cables and communication is based on the Modbus RTU communication protocol. Temperature data from each channel of are transferred through the RS485 communication interface to geometric/thermal measurement error and compensation host; (4) Geometry/thermal error measurement and compensation host 2 is connected through UTP crossover cable with FANUC numerical control system 1, based on the FOCAS II network protocol for communication.

The measurement and compensation software is run in the geometry/thermal error measurement and compensation host. Based on the acceleration signal, the software uses the feed axis geometric error identification algorithm to obtain the straightness error of the machine feed axis. The feed axis geometric error identification algorithm is shown in Equations (1)-(3). Thermal errors are predicted in real time based on the position and temperature signals and application of the feed shaft thermal error model shown in Equation (4).

Figure 2:
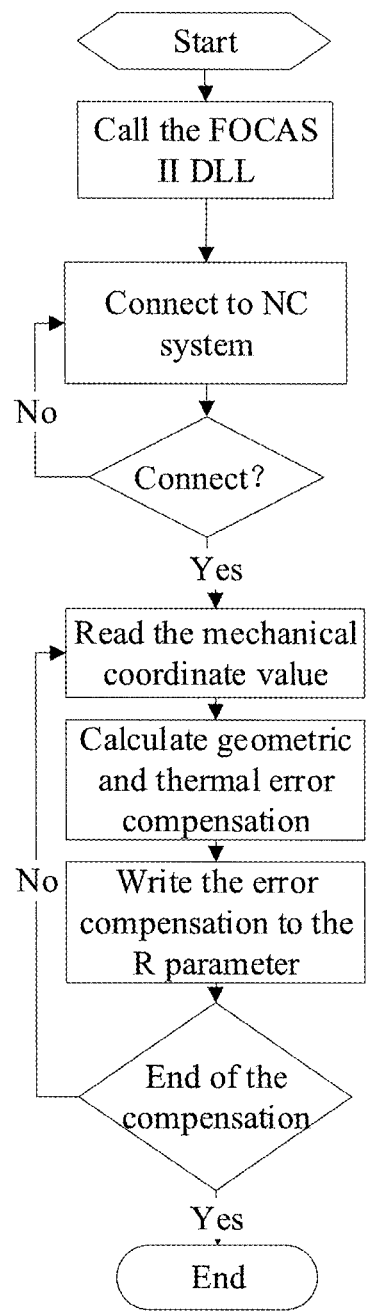
FIG. 2 is a flowchart of the communication process between the error online measurement and compensation system and the FANUC numerical control system.
Figure 3:
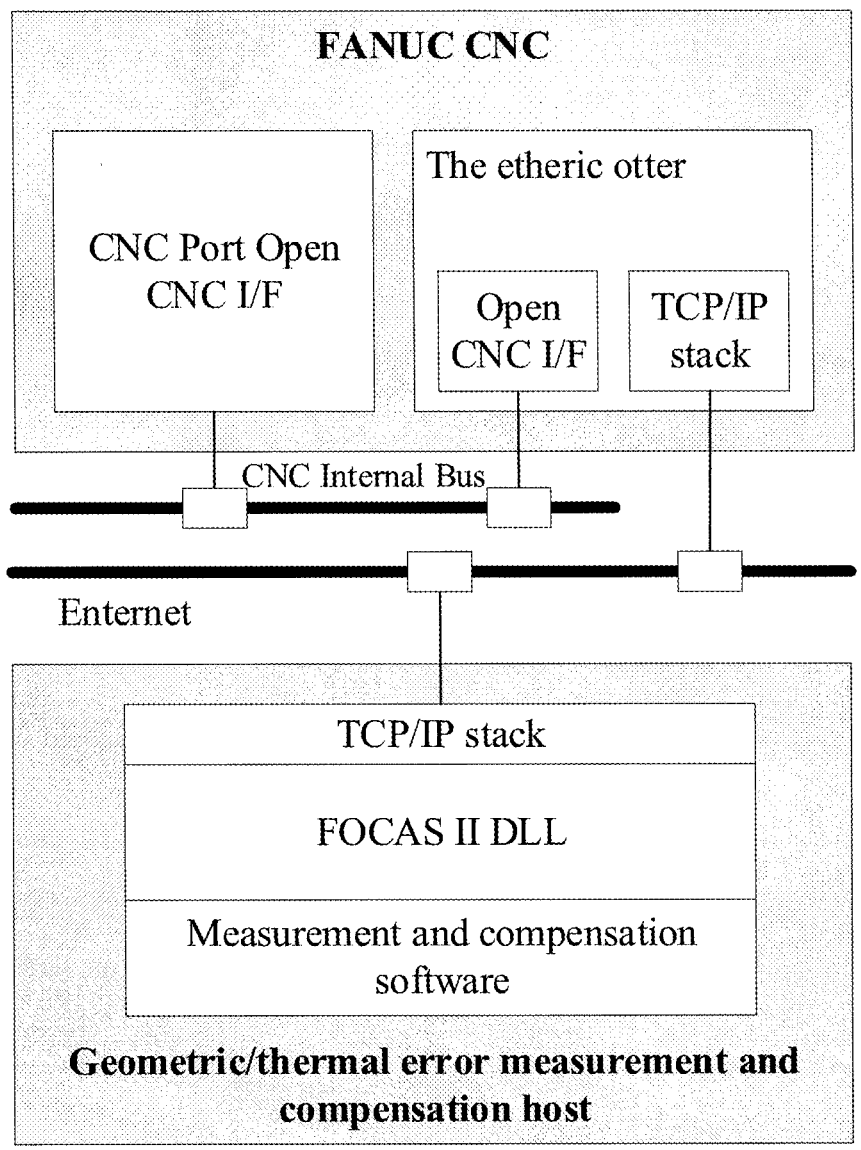
FIG. 3 is a schematic diagram of the communication process based on the FOCAS II protocol.

Measurement and compensation software of the FANUC numerical control system with FOCAS II protocol communication achieves coordinated writing and reading of error compensation values of the machine tool. The communication process is shown in FIG. 2 and the communication diagram is shown in FIG. 3. Compensation with the FANUC control system is based on the extended external mechanical coordinate origin offset function. The specific steps are as follows:

(1) Set "embedded/PCMCIA" as a valid Ethernet device in the FANUC control system;

(2) Set parameter 1280 to 1000, i.e., compensation data corresponding to the R parameter start address;

(3) Set the first 0 bit of parameter 1203 to 1 bit, i.e., open the extended external machine coordinate origin offset function;

(4) The measurement and compensation software will establish a connection with IP address 192.168.1.1 and port number 8193 of the FANUC numerical control system. Once the connection is successful, mechanical coordinates of the feed axis are read and data of the acceleration sensor and the temperature sensor are simultaneously collected. Then the integrated geometric/thermal error compensation value is calculated and an error compensation value is written to the numerical control system. The error compensation value is calculated using Equation (5).

Figure 4A:
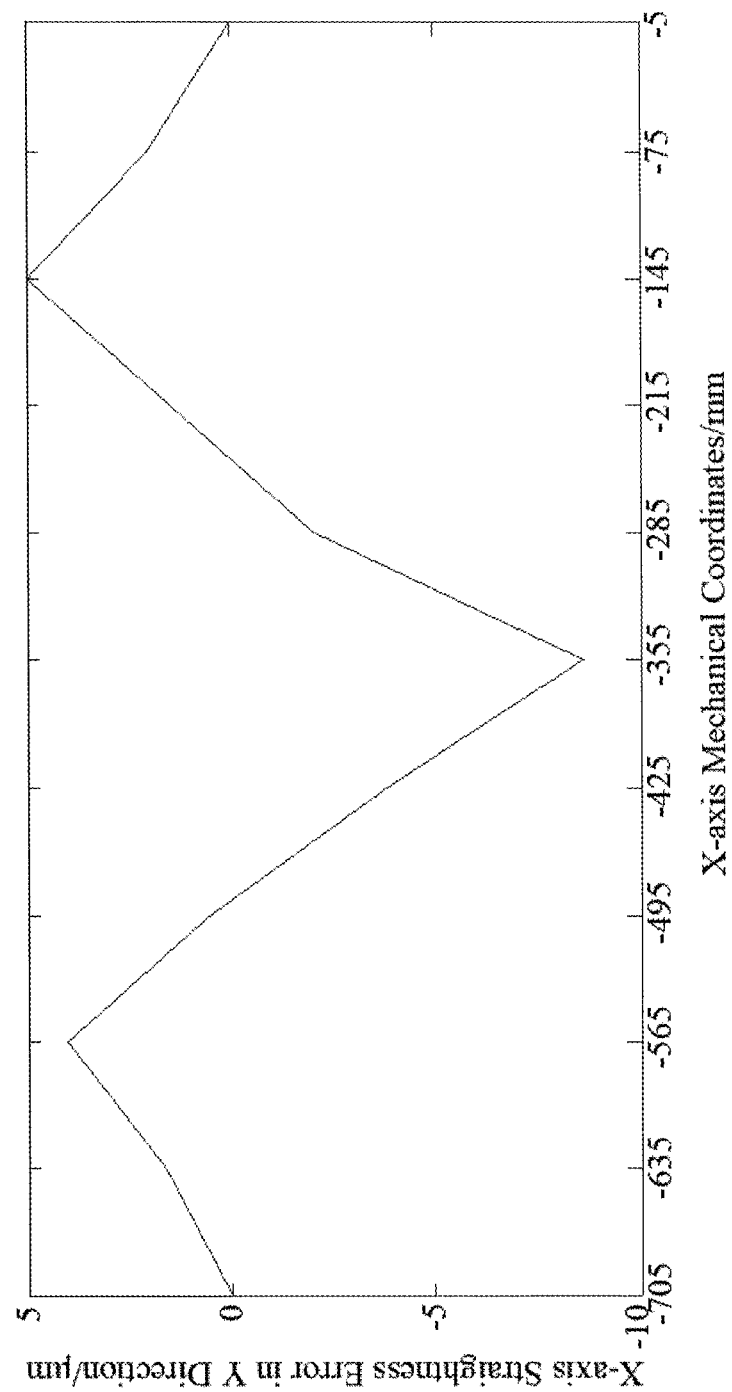
FIG. 4($a$) is the straightness error test curve of the X-axis along the Y-direction and FIG. 4($b$) is the straightness error test curve of the X-axis along the Z-direction.
Figure 4B:
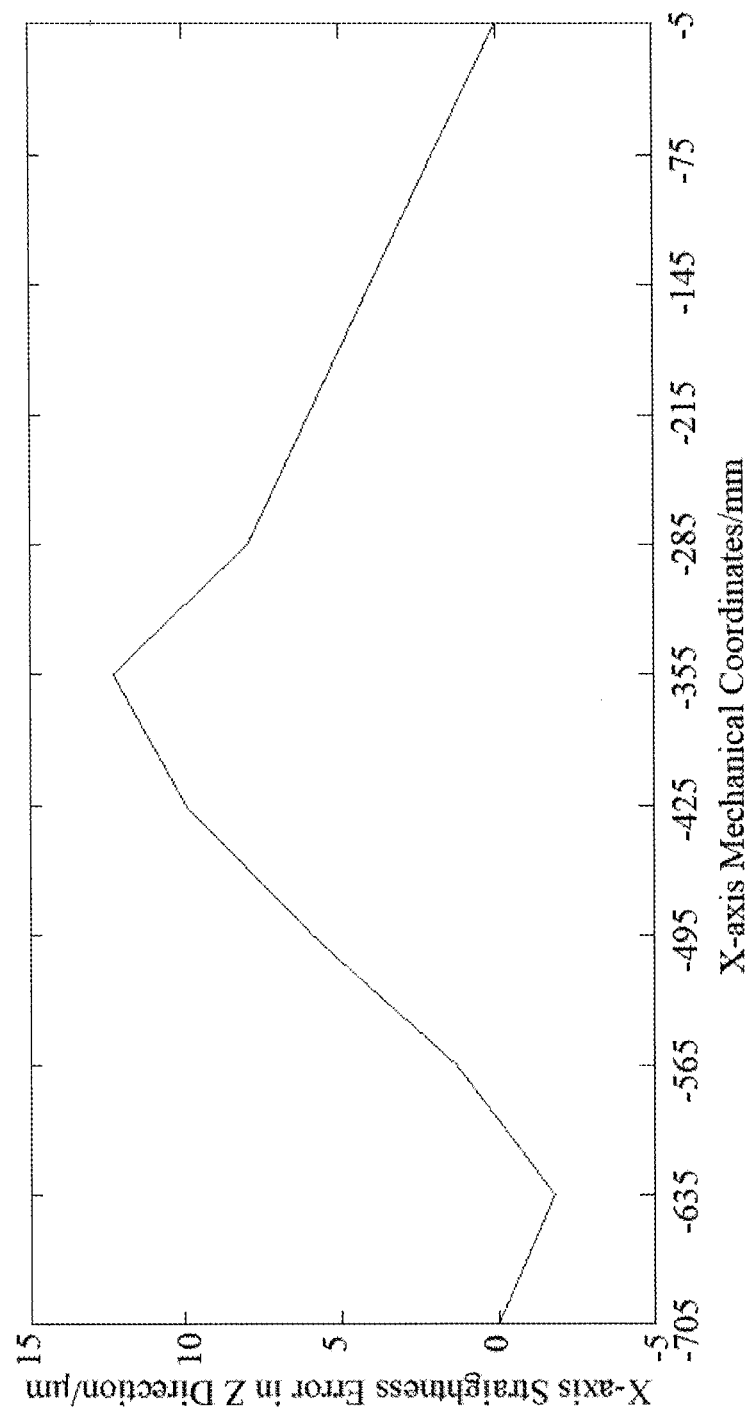

In order to verify the actual impact of the present invention, error testing was performed on the X-axis along the Y the Z linear directions in the range of 11 test points of the above-described embodiment of the online geometry/thermal online error measurement and compensation system for CNC machine tools. In the Y-direction, the straightness error test curve is shown in FIG. 4(a) and in the Z-direction, the straightness error test curve is shown in FIG. 4(b).

The embodiment of the online CNC machine geometric/thermal error measurement and compensation system was demonstrated, as the X —axis of the geometric and thermal errors were compensated. Thermal error test procedure: cold test X-axis full-stroke positioning error. After X-axis heating motion, specifically, heating of the X-axis at machine coordinates –200 mm to 600 mm up to a feed rate of 8000 mm/min, is produced by linearly reciprocating motion, the heating motion lasts 30 min. Once heating motion on the X-axis is stops at the 0 mm position in the mechanical coordinate system, the cooling process begins and lasts 20 min. The X-axis full-stroke positioning error test was performed every 10 minutes during the entire heating and cooling process.

Figure 5A:
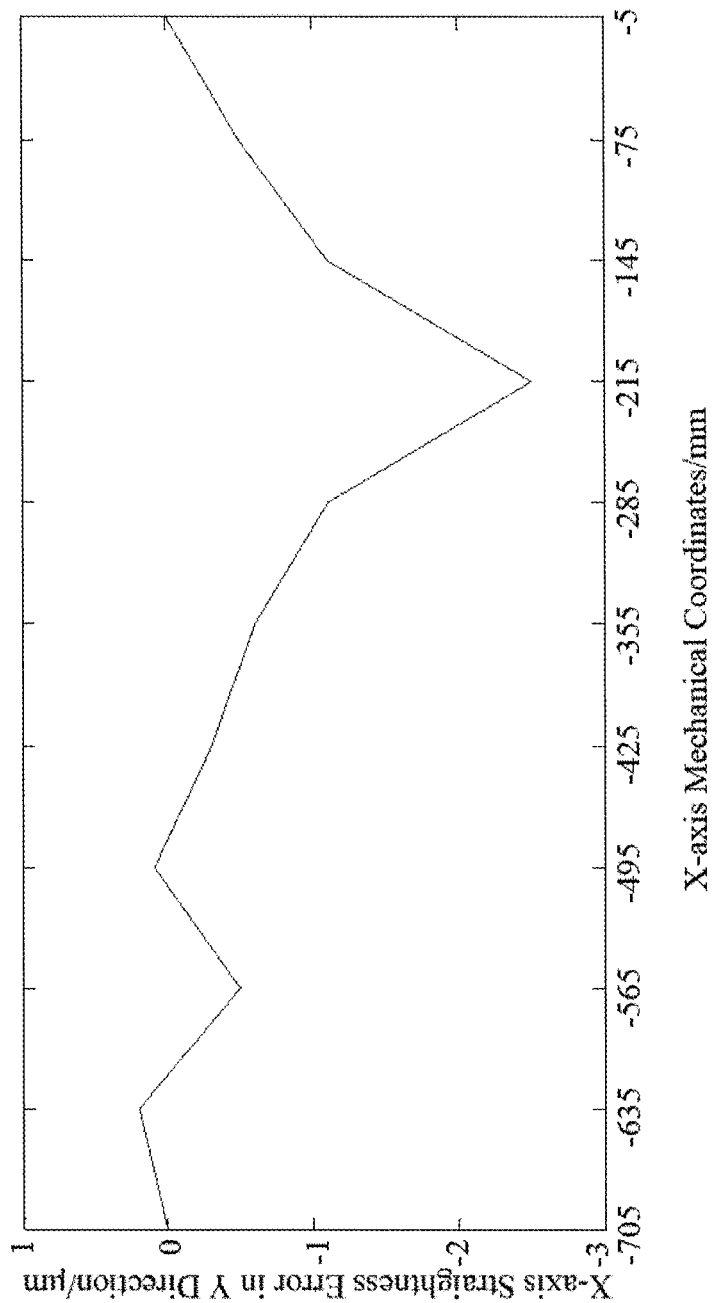
FIG. 5($a$) is the straightness error curve of the X-axis along the Y-direction after compensation and FIG. 5($b$) is the straightness error curve of the X-axis along the Z-direction after compensation.
Figure 5B:
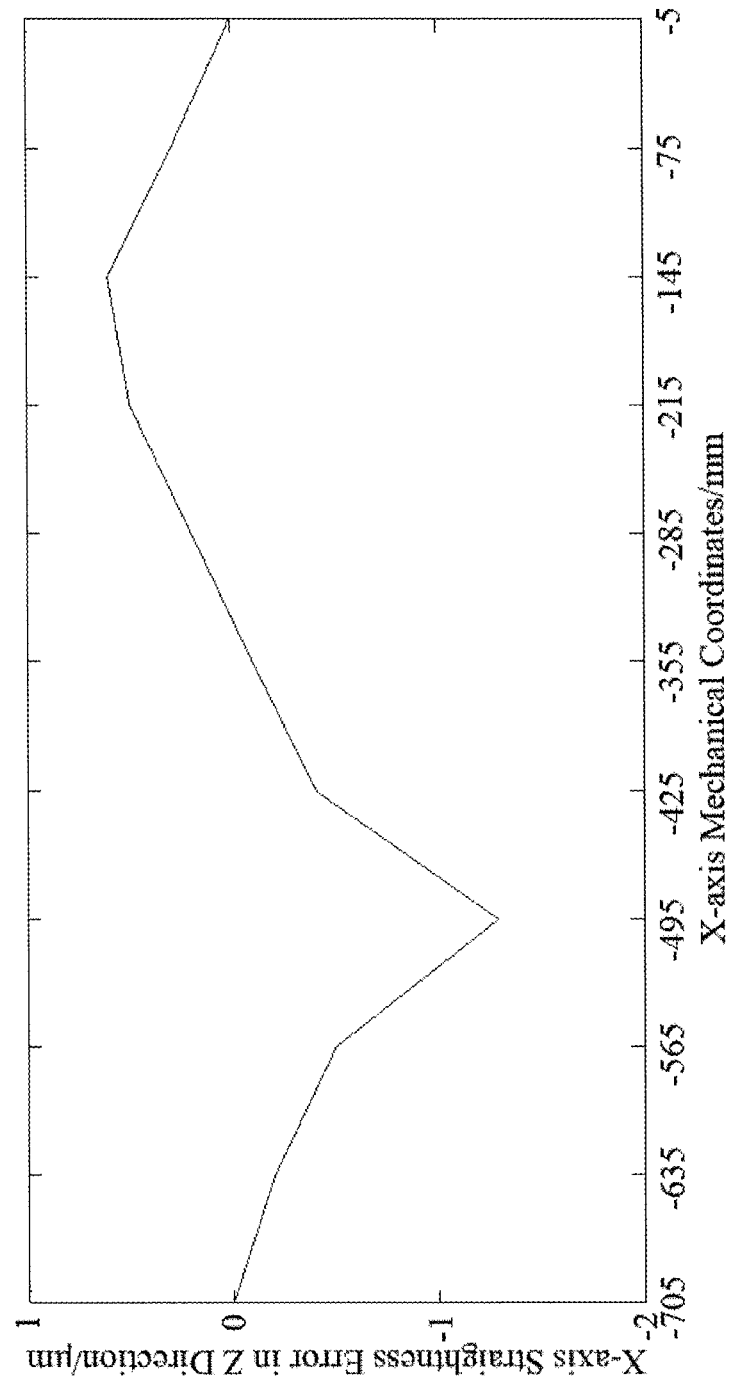
Figure 6:
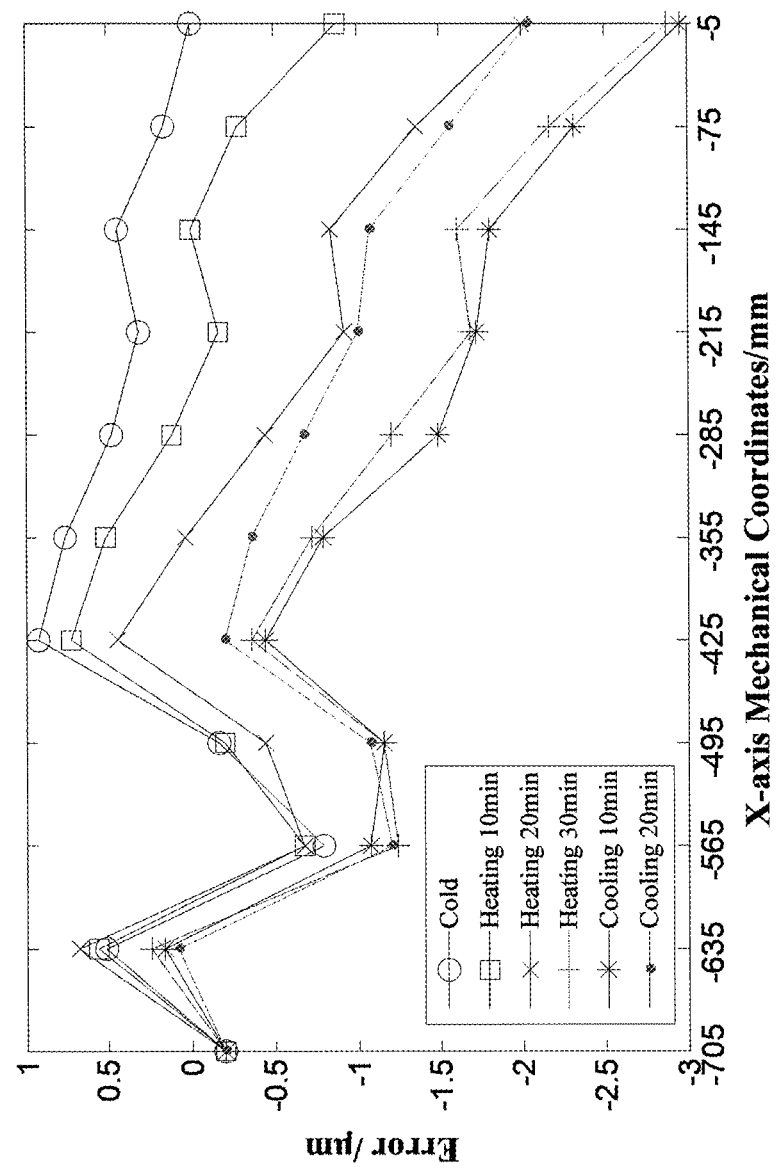
FIG. 6 is the thermal error curve of the X-axis after compensation.

Straightness of X-axis error curves along the Y and Z directions after compensation are shown in FIGS. 5(a) and (b), respectively. The thermal error curve after compensation is shown in FIG. 6.

The invention claimed is:

1. An online geometric/thermal error measurement and compensation system for CNC machine tools, the online CNC machine tool geometric and/or thermal error measurement and compensation system is mainly comprised of two parts: a hardware of measurement and compensation system and a software of measurement and compensation system; the hardware of measurement and compensation system comprises a unidirectional acceleration sensor, a digital precision IC temperature sensor, a multi-pass channel temperature data logger and a geometric and/or thermal error measurement and compensation host; geometric and/or thermal error data processing and compensation, communication with numerical control system and reading and writing data are controlled via the software of measurement and compensation of the system operated in the geometric and/or thermal error measurement and compensation host;

wherein the unidirectional acceleration sensor is connected to the geometric/thermal error measurement and compensation host via a coaxial shielded cable and the acceleration signal is sent to the geometric and/or thermal error measurement and compensation host in analog form; the digital precision IC temperature sensor connects to a multi-pass channel temperature data logger through a four-core shielded cable and sends temperature data to a multi-pass channel temperature data logger based on a single-line bidirectional communication protocol; the multi-pass channel temperature data logger can connect to up to ten temperature sensors; the multi-pass channel temperature data logger connects to the geometric and/or thermal error measurement and compensation host through the three-core shielded cable and sends the aggregated temperature data to the geometric and/or thermal error measurement and compensation host based on the Modbus RTU communication protocol; the geometric/thermal error measurement and compensation host connects to the FANUC CNC through a twisted pair cross cable and the communication is carried out based on the FOCAS II network communication protocol;

software of measurement and compensation system:

(1) based on the acceleration signal, the straightness error of the feed axis of the machine tool is obtained by applying the geometric error identification algorithm of the feed axis; the geometric error identification algorithm of the feed axis is $$\begin{cases} s(t) = \int\int a(t)dt - \frac{1}{2}a_0 t^2 - v_0^\perp t - x_0^\perp \\ x(t) = v^\parallel \end{cases} \quad (1)$$

where s(t) is the real-time displacement, $x_0^\perp$ is the initial displacement in the vertical direction, $v_0^\perp$ is the initial velocity perpendicular to the axial direction, $a_0$ is the DC component of the acceleration signal, a(t) is the real-time acceleration, $v^\parallel$ is the constant velocity along the axial direction, and x(t) is the axial real-time length;

solving Equation (1), the relationship between the real-time displacement s(t) and the axial test stroke x is obtained as $$s(x) = \int\int a(x/v^{\|})dt - \frac{1}{2}a_0\left(\frac{x}{v^{\|}}\right)^2 - v_0^+ t - x_0 \qquad (2)$$

then, the two-point line connection method is applied to calculate the straightness error of the feed axis according to s(x); the specific calculation is $$E_s(x) = s(x) - \frac{s(\text{end}) - s(0)}{L}x \qquad (3)$$

where $E_s(x)$ is the straightness error, L is the total test stroke, x is the test stroke, s(end) is the final displacement at the end of the test, and s(0) is the displacement at the starting point of the test;

(2) based on the position and the temperature signal applied to the feed shaft thermal error model, thermal errors are predicted in real time; dividing the feed shaft thermal error model screw into N segments, each of length l, the thermal error is calculated as $$E_f(m, t) = \sum_{i=1}^{m} k \times l \times (T_i(t) - T_0) \qquad (4)$$

$$T_i(t) = T_i(t - \Delta t) + \gamma \times Q - \left\{\alpha \times \frac{[T_i(t - \Delta t) - T_{i-1}(t - \Delta t)] + [T_i(t - \Delta t) - T_{i+1}(t - \Delta t)]}{l} + \beta \times [T_i(t - \Delta t) - T_f(t - \Delta t)]\right\} \times \Delta t$$

where $E_f(m,t)$ is the calculated value of thermal error to the m-th section of the screw at the current time, $T_i(t)$ is the temperature corresponding to the i-th section of the screw at the current time, Q is the heat generated through the nut of the screw in each segment, $T_i(t-\Delta t)$ is the temperature to the i-th section of the screw at the previous time, $T_f(t-\Delta t)$ is the temperature of the air in contact with the surface of the screw at the previous moment, $\Delta t$ is the sampling period, and k, $\alpha$, $\beta$, and $\gamma$ are coefficients;

(3) to realize communication with FANUC numerical control system based on the FOCAS II protocol, reading of the machine tool coordinates and writing of the error compensation value, and compensation based on extended external mechanical coordinate origin offset function, the following steps are performed:
1) set "embedded/PCMCIA" as a valid ethernet device in the FANUC control system;
2) set relevant parameters of the "expanded external machine coordinate origin shift function" and turn on the function;
3) the measurement and compensation system software establishes a connection with the IP address and port number of the FANUC numerical control system; once the connection is successful, the mechanical coordinates of the feed axis are read, data from the unidirectional acceleration sensor and the temperature sensor are simultaneously acquired, and the geometry and/or heat is calculated; the integrated error compensation value is used to write the error compensation value to the numerical control system; the current integrated geometric and/or thermal error compensation value is calculated as follows:

$$C(x,t) = -[E_s(x) + E_f(m,t)] \qquad (5).$$

\* \* \* \* \*